United States Patent Office 2,925,415
Patented Feb. 16, 1960

2,925,415
KETALIZATION OF HINDERED 20-KETO STEROIDS

Bjarte Loken, Sarpsborg, Norway

No Drawing. Application February 25, 1959
Serial No. 795,361

6 Claims. (Cl. 260—239.55)

The present invention relates to a novel procedure for preparing 20-ethylenedioxy-5-pregnene derivatives in which there is a linkage at the 17α-position to an oxygen atom and which are thereby sterically hindered. More specifically the invention relates to the process of formation of compounds of the structural formulas

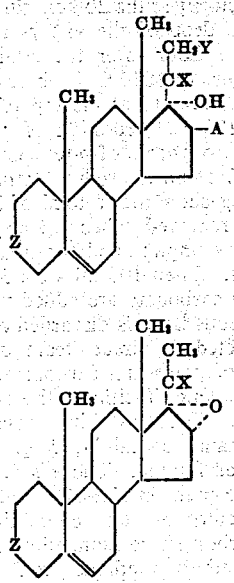

and

wherein A is hydrogen or methyl, X is an

—O—CH$_2$—CH$_2$—O— group, Y is a hydrogen, hydroxy or acyloxy group and Z is a hydroxymethylene, acyloxymethylene or an ethylenedioxymethylene radical. The acyl groups referred to are derived from lower alkanoic acids such as acetic, propionic, butyric, valeric or caproic acid.

The foregoing compounds are conveniently prepared in good yields by heating of the corresponding compound of the same structural formula but wherein X is defined as =O, with a dioxolane of the structural formula

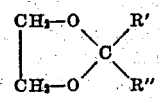

wherein R' and R" are members of the class consisting of hydrogen, methyl and ethyl, in the presence of a catalytic quantity of ethylene glycol. This ketalization is carried out in the presence of an acid catalyst, preferably sulfuric acid or an aryl sulfonic acid such as benzenesulfonic acid, toluenesulfonic acid, chlorobenzenesulfonic acid and naphthalenesulfonic acid.

The reaction apparently proceeds in a sequence which can be depicted by the following scheme, in which R=CO represents the 20-keto steroid and R' and R" are defined as hereinabove.

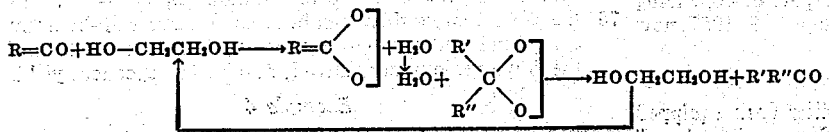

As the foregoing reaction sequence indicates, ethylene glycol acts as an intermediate catalyst. Only a relatively small quantity of ethylene glycol need be added and in practice it has been found that about 1–15% by weight of ethylene glycol (based on the weight of the total mixture) can be usefully employed. The steroidal 20-ketone R=CO reacts with the ethylene glycol to form the desired steroidal ketal and one molecule of water. This molecule of water reacts with the dioxolane in the reaction mixture to generate further ethylene glycol and produces as a by-product one molecule of a compound of the formula

R'R"CO

The reaction is carried out in a one-phase system, and this distinguishes the procedure from that described by Fernholz et al. (U.S. Patents 2,356,154 and 2,378,918). In the Fernholz procedure ethylenedioxy derivatives of steroidal ketones are prepared by refluxing the ketone and excess ethylene glycol in benzene, toluene, or dichloroethane; the water formed by the condensation is removed as an azeotrope and the upper layer of the distillate after separation is returned to the reaction mixture. This method has been found to give low yields with sterically hindered 20-ketosteroids and is not adaptable to industrial applications. The present procedure, on the other hand, gives very high yields of the 20-ethylenedioxy derivatives even in the presence of severe steric hindrance.

Among the dioxolanes which are useful for use in the procedure claimed are dioxolane itself, its 2-methyl-2-ethyl, 2,2-dimethyl, and 2,2-diethyl derivatives. The preferred dioxolane is 2-methyl-2-ethyl-1,3-dioxolane because the released compound R'COR" is in this case butanone, which has a favorable boiling point. Butanone is removed from the system by distillation which is operated at a very high reflux ratio, thus permitting the butanone to be removed as it forms, and thereby favorably displacing the equilibrium. Since butanone boils at 80° C. and 2-methyl-2-ethyl-1,3-dioxolane at 118° C. it is easy to control the progress of the reaction in accordance with the temperature of the vapors at the top of the distillation column. A more accurate control of the state of the reaction, if desired, can be achieved by measuring the volume of the distillate, reading the refractive index of the mixture of butanone and 2-methyl-2-ethyl-1,3-dioxolane and making a comparison with a curve of the refractive indices plotted for the system as a function of its butanone content. 2-methyl-2-ethyldioxolane has a refractive index $n_D$ of 1.4085 and butanone one of 1.3777 and it is possible to establish at any time exactly how much butanone has been removed from the system and in that way to determine the rate of completion of the reaction. Control of this reaction is important because an excessively long reaction time gives rise to polymerization which hinders the crystallization of the final product in such a way that lower yields are obtained. Completion of the reaction can also be determined by an infrared examination, and specifically by the elimination of the band in the 5.9 micron region.

When other dioxolanes are used such diluents as methylcyclohexane, benzene, toluene, and xylene can be employed so as to obtain optimal distillation conditions. However, the 2-methyl-2-ethyldioxolane, which can be used with or without diluent, appears to be the preferred reagent.

The procedure also has great advantages over that of Dauben, Löken and Ringold (J. Am. Chem. Soc., 76, 1359; 1954), which employs an exchange dioxolanation between a steroidal ketone and dialkyldioxolanes. While this method is very useful for the selective ketalization of steroidal keto groups exhibiting a low degree of steric hindrance, it is not practical for the preparation of ethylenedioxy derivatives of 20-keto steroids which are strongly hindered, particularly by 17α-hydroxy or 16,17-epoxy substituents. Thus, ketalization in the case of 3β-acetoxy-16α,17α-epoxy-5-pregnen-20-one requires 6 days under Dauben condition, whereas with the present procedure, which differs in the addition of a small amount of ethylene glycol to the reaction mixture, the reaction can be completed in about 12 hours.

Of special importance for the purpose of this invention are the 17-substituted derivatives of progresterone. These compounds contain, in addition to the sterically hindered 20-keto group, the sertically unhindered 3-keto group. Using the Dauben procedure mentioned hereinabove, the 3-keto group can be readily converted to the 3-ethlyenedioxy group with a concomitant shift of the unsaturated linkage from the 4-position to the 5-position. The resulting derivative of a 3-ethylenedioxy-5-pregnen-20-one need not be isolated; instead the ketalization of the 20-position can be accomplished by addition of ethylene glycol to the reaction mixture and use of the refluxing procedure with removal of the alkanone R'COR".

More conveniently the ketalization of a polyketone can be carried out by a continuous process using the same reaction mixture as employed for the ketalization of the 20-ketone; in such a case 3-ethylenedioxy-5-pregnen-20-one is presumably formed as an intermediate.

The present procedure provides 20-ethylenedioxy steroids which are valuable chemical intermediates. The desirability of temporarily blocking the 20-keto function of a steroid is well recognized in the art, for instance, where Grignard reactions are to be carried out on the derivatives. A typical example is the prepartion of 6-methylated cortical steroids such as those described by G. B. Spero et al., J.A.C.S., 78: 6213, 1956. The method is also of special utility in the preparation of 16β-methyl steroids. Thus, 3β,17α-dihydroxy-16β-methyl-5-pregnen-20-one can be prepared by a procedure developed by Dr. Luis Miramontes using as a starting material 3β-hydroxy-16-methyl-5,16-pregnadien-20-one which is selectively epoxidized to the 16α,17α-epoxide and then treated with hydrogen bromide.

The 20 - ethylenedioxy - 16β - methyl - 5 - pregnene-3β,17α-diol is a valuable intermediate. Thus on Oppenauer oxidation the Δ4-3-ketone is formed without significant D-homo rearrangement and on hydrolysis there is obtained the 16β-ethyl-17α-hydroxyprogesterone; the latter can be acetylated to the 17-acetoxy derivative which is an anti-estrogenic agent of low progestational activity.

16β - methyl - 20 - ethylenedioxy - 5 - pregnene - 3β,17α-diol can also be used as an intermediate for the preparation of 6,16-dimethyl steroids. Thus, the 5-pregnene is subjected to the usual epoxidation procedure to form the 5,6-epoxide which is then subjected to a Grignard reaction in the manner used for the preparation of other 6-methyl steroids so as to yield the 6,16-dimethyl derivatives of cortical steroids which are potent neoglycogenetic and anti-inflammatory agents.

This invention will appear in further detail from the experiments set forth hereinafter. However, these are not to be construed as limiting it in spirit or in scope.

This application is a continuation-in-part of copending application Serial No. 677,836, filed August 13, 1957, now abandoned.

*Example 1*

The reaction is carried out in a 2-liter flask equipped with a packed column and a total reflux partial take-off head. In this apparatus a mixture of 69 g. of 17α-hydroxyprogesterone and 690 ml. of 2-methyl-2-ethyl-1,3-dioxolane is distilled employing a reflux ratio of 1:40. When the temperature on top of the column has reached a constant level at 118° C., 270 mg. of p-toluene-sulfonic acid monohydrate are added and the heat is regulated to achieve maximum reflux in the column; 6 drops of distillate per minute are taken off. After 4 hours the ketalization at the 3-carbonyl group is completed and the temperature at the top of the column remains constant at about 118° C. Refractive index readings of the distillate show that 18 ml. of butanone have been removed from the reaction (theory 18.75 ml.). At this point 11 ml. of ethylene glycol and approximately 50 mg. of the same acid catalyst are added to the mixture which is heated again as before except that only 2 drops per minute of distillate are collected. That the ketalization now progresses satisfactorily at the 20-keto function is indicated by a temperature drop of the vapors at the top of the column. About 1 hour after the addition of ethylene glycol a temperature of 105° C. is observed. After about 12 hours, the temperature at the top of the column has again reached 118° C. Addition of a further 50 mg. portion of the monohydrate of p-toluenesulfonic acid has no appreciable effect on the reflux temperature. Refractive index readings show that a total of 36.5 ml. of butanone have been removed (theory 37.5). The reaction is thus essentially complete and the mixture is cooled in an ice water bath. Then 100 ml. of a 5% aqueous solution of potassium carbonate are added with vigorous agitation. The aqueous layer is discarded and the dioxolane solution is subjected to direct steam distillation in the presence of 1 g. of potassium carbonate. The residue in the flask solidifies which facilitates the decantation of the condensed steam. The crystalline mass is suspended in 200 ml. of methanol containing 5 g. of potassium bicarbonate and then filtered. There is thus obtained 3,20-bisethylenedioxy-5-pregnen-17α-ol. This crude product is dissolved in dichloromethane containing calcium oxide and activated carbon suspension, filtered and concentrated. Then 250 ml. of methanol containing 0.5 ml. of pyridine are added and on further concentration which removes the residual dichloromethane there is obtained the pure compound melting at about 207–208.5° C. The rotation of the chloroform solution $\alpha_D$ is —48°.

*Example 2*

In the apparatus described in Example 1 a mixture of 70 g. of 16α,17α-epoxy-4-pregnene-3,20-dione, 690 ml. of 2-methyl-2-ethyl-1,3-dioxolane and 11 ml. of ethylene glycol is distilled employing a reflux ratio of 1:40 until the temperature at the top of the column has reached 118° C. Then 300 mg. of p-toluenesulfonic acid catalyst are added and the mixture is maintained at reflux as in the preceding example, 2 drops of distillate being removed per minute. Purification as in the preceding example yields 3,20-bisethylenedioxy-16α,17α-epoxy-5 - pregnene melting at about 185–186.5° C. The rotation of the chloroform solution $\alpha_D$ is —23°. Reduction of this bisethylene ketal with sodium borohydride in refluxing tetrahydrofuran-ethanol solution containing sodium hydroxide for 9 hours yields 3,20-bisethylenedioxy-5-pregnen-17α-ol identical with the product as described in Example 1.

*Example 3*

The reaction of the foregoing example is carried out with 3β-acetoxy-16α,17α-epoxy-5-pregnen-20-one. There is thus obtained the 3β-acetoxy-16α,17α-epoxy-20-ethylenedioxy-5-pregnene melting at about 193–194° C. The rotation of the chloroform solution $\alpha_D$ is —38°. In the same manner there can be reacted the free 3β-hydroxy compound and the 3β-butyroxy analog. In each case the ethylenedioxy derivative is obtained in excellent yield.

*Example 4*

In the procedure of Example 2, 35 g. of 3β,17α-dihydroxy-5-pregnen-20-one are substituted for the 70 g. of 16α,17α-epoxy-4-pregnene-3,20-dione to yield 20-ethylenedioxy-5-pregnene-3β,17α-diol melting at about 187.5–189.2° C. The rotation of a chloroform solution $\alpha_D$ is —45.5°. A relatively small amount of steroid is used in the reaction mixture because of the low solubility of the compound.

Example 5

In a flask equipped with a packed reflux column and a total reflux partial take-off head, a mixture of 72 g. of 17α,21-dihydroxyprogesterone and 690 ml. of 2-methyl-2-ethyl-1,3-dioxolane is distilled until the top of the column attains a constant temperature of about 118° C. Then 275 mg. of the monohydrate of p-toluenesulfonic acid is added and the heat is regulated to achieve maximal reflux in the column, 6 drops of distillate per minute being taken off. After 4 hours, 11 ml. of ethylene glycol and 50 mg. of the monohydrate of p-toluenesulfonic acid are added and refluxing is continued at such a rate that about 2 drops per minute of distillate are collected. An additional portion of 50 mg. of p-toluenesulfonic acid monohydrate is added and refluxing is continued for a day after which the reaction mixture is cooled in an ice bath. Then 100 ml. of a 5% aqueous solution of potassium carbonate are added with vigorous agitation. The organic layer is separated and subjected to direct steam distillation in the presence of 1 g. of potassium carbonate. The residue in the flask crystallizes and the crystalline mass is separated and suspended in a solution containing 5 g. of potassium bicarbonate in methanol and filtered. The cooled product is dissolved in dichloromethane containing calcium oxide and activated carbon in suspension, filtered and concentrated. On addition of methanol and further concentration until the residual dichloromethane is eliminated there is obtained 3,20-bisethylenedioxy-5-pregnene-17α,21-diol, which, on recrystallization from a mixture of acetone and ether, melts at about 216–218° C. The rotation of a chloroform solution $\alpha_D$ is —36°.

The reaction can be carried out under the same conditions with the 16β-methyl derivative.

Example 6

In a flask equipped with a packed reflux column and a total reflux partial take-off head, a mixture of 18 g. of 17α-hydroxy-21-acetoxy-4-pregnene-3,20-dione and 690 ml. of 2-methyl-2-ethyl-1,3-dioxolane is distilled until the top of the column reaches a constant temperature of about 118° C. After addition of 275 mg. of the monohydrate of p-toluenesulfonic acid the heat is adjusted so that maximum reflux is achieved, 6 drops of distillate per minute being taken off. After 4 hours a heavy crystalline slurry is obtained containing mainly the 3-monoketal, i.e. 3-ethylenedioxy-17α-hydroxy-21-acetoxy-5-pregnen-20-one. Then 11 ml. of ethylene glycol and 50 mg. of the monohydrate of p-toluenesulfonic acid are added and refluxing is continued so that about 2 drops of butanone are collected per minute. An additional portion of 50 mg. of p-toluenesulfonic acid monohydrate is added and refluxing is continued for 40 hours after which the reaction mixture is cooled in an ice bath. Then 100 ml. of a 5% aqueous solution of potassium carbonate are added with stirring. The organic layer is separated and subjected to direct steam distillation in the presence of 1 g. of sodium carbonate. The residue in the flask becomes crystalline and the precipitate is suspended in a solution containing 5 g. of potassium bicarbonate in methanol and filtered. The cooled product is dissolved in dichloromethane containing calcium oxide in activated charcoal in suspension, filtered and concentrated. All dichloromethane is removed by continued concentration with occassional addition of methanol so as to yield 3,20-bisethylenedioxy-21-acetoxy-5-pregnen-17α-ol which, recrystallized from a mixture of acetone and ether, melts at about 216–217.5° C. The rotation of a chloroform solution is $\alpha_D$ —36°.

Example 7

To a solution of 10 g. of 16β-methyl-3β,17α-dihydroxy-5-pregnen-20-one in 150 ml. of 2-methyl-2-ethyl-1,3-dioxolane are added 5 parts of ethylene glycol and then 0.2 g. of p-toluenesulfonic acid monohydrate. The mixture is distilled in a flask equipped with a packed column and a total reflux partial take-off head for 41 hours. A high reflux ratio is maintained and only 20 ml. of the mixture of 2-methyl-2-ethyl-1,3-dioxolane and butanone are removed during this period of reaction. Completeness of the reaction is indicated by the following criteria:

(1) Complete reflux in the column achieved by turning off the take-off stop cock does not change the vapor temperature at the top of the column, which remains constant at the boiling of 2-methyl-2-ethyl-1,3-dioxolane, 118° C.

(2) Refractive index readings of the total distillate collected indicate that exactly 1 molecular equivalent of butanone has been removed.

(3) Infrared measurements of the total solids do not show evidence of the presence of any 20-ketone.

The reaction mixture is cooled, after which 200 ml. of a 5% potassium carbonate solution are added and the mixture is shaken vigorously. The lower layer is discarded and the upper layer is dried over anhydrous potassium carbonate and concentrated to a small volume under reduced pressure on the steam bath. Addition of methanol containing a trace of pyridine causes the residual oil to crystallize. The crystals are collected on a filter and recrystallized from a mixture of dichloromethane and methanol containing a trace of pyridine and there is thus obtained 16β-methyl-20-ethylenedioxy-5-pregnene-3β,17α-diol melting at about 176–178° C. The rotation of the chloroform solution $\alpha_D$ is —54°.

What is claimed is:

1. The process for the preparation of a member of the class consisting of the formulas

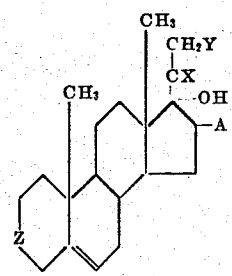

and

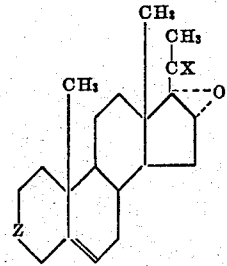

wherein A is a member of the class consisting of hydrogen and methyl, X is an —O—CH$_2$—CH$_2$—O— group, Y is a member of the class consisting of hydrogen, hydroxy and lower alkanoyloxy groups, and Z is a member of the class consisting of β-hydroxymethylene, β-alkanoyloxymethylene and

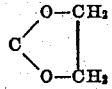

groups, which comprises refluxing the compound of the same structural formula but wherein X is defined as =O with a compound of the formula

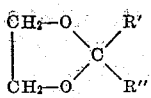

wherein R' and R" are members of the class consisting of hydrogen, methyl and ethyl in the presence of 1–15% by weight of ethylene glycol and an acid catalyst of the class consisting of sulfuric acid and arylsulfonic acids.

2. The process according to claim 1, wherein R' is a methyl and R" is an ethyl group.

3. The process for the preparation of 3,20-bisethylenedioxy-5-pregnen-17α-ol which comprises refluxing 3-ethylenedioxy-17α-hydroxy-5-pregnen-20-one with 2-methyl-2-ethyl-1,3-dioxolane in the presence of 1–15% by weight of ethylene glycol and an acid catalyst of the class consisting of sulfuric acid and arylsulfonic acids.

4. The process for the preparation of 3,20-bis-ethylenedioxy-5-pregnen-17α-ol which comprises refluxing 17α-hydroxyprogesterone with 2-methyl-2-ethyl-1,3-dioxolane in the presence of 1–15% by weight of ethylene glycol and an acid catalyst of the class consisting of sulfuric acid and arylsulfonic acids.

5. The process for the preparation of 3,20-bisethylenedioxy-5-pregnene-17α,21-diol which comprises refluxing 3-ethylenedioxy-17α,21-dihydroxy-5-pregnen-20-one with 2-methyl-2-ethyl-1,3-dioxolane in the presence of 1–15% by weight of ethylene glycol and an acid catalyst of the class consisting of sulfuric acid and arylsulfonic acids.

6. The process for the preparation of 3,20-bisethylenedioxy-5-pregnene-17α,21-diol which comprises refluxing 17α,21-dihydroxyprogesterone with 2-methyl-2-ethyl-1,3-dioxolane in the presence of 1–15% by weight of ethylene glycol and an acid catalyst of the class consisting of sulfuric acid and arylsulfonic acids.

References Cited in the file of this patent

UNITED STATES PATENTS

| | | |
|---|---|---|
| 2,648,662 | Julian et al. | Aug. 11, 1953 |
| 2,700,666 | Bernstein et al. | Jan. 25, 1955 |
| 2,802,825 | Dauben et al. | Aug. 13, 1957 |
| 2,824,100 | Long et al. | Feb. 18, 1958 |

UNITED STATES PATENT OFFICE

CERTIFICATE OF CORRECTION

Patent No. 2,925,415            February 16, 1960

Bjarte Loken

It is hereby certified that error appears in the printed specification of the above numbered patent requiring correction and that the said Letters Patent should read as corrected below.

Column 3, line 21, for "sertically" read -- sterically --; line 54, for "16β-ethyl" read 16β-methyl --.

Signed and sealed this 16th day of August 1960.

(SEAL)
Attest:
KARL H. AXLINE

Attesting Officer

ROBERT C. WATSON
Commissioner of Patents